United States Patent [19]

Porembski

[11] Patent Number: 4,775,397

[45] Date of Patent: Oct. 4, 1988

[54] AIR SUPPLY AND RECIRCULATION SYSTEM

[75] Inventor: Thaddeus T. Porembski, Jacksonville, Fla.

[73] Assignee: Westinghouse Electric Corp., Pittsburgh, Pa.

[21] Appl. No.: 841,677

[22] Filed: Mar. 19, 1986

Related U.S. Application Data

[63] Continuation of Ser. No. 604,300, Apr. 26, 1984, abandoned.

[51] Int. Cl.$^4$ .............................................. B01D 46/00
[52] U.S. Cl. ............................................................ 55/97
[58] Field of Search ................................. 55/312–314, 55/484, 97–99; 210/97, 167, 254, 253, 340, 341, 418, 420, 900, 919

[56] References Cited

U.S. PATENT DOCUMENTS 3,870,033  3/1975  Faylor et al. ................. 210/900
3,964,887  6/1976  Hickey et al. ................. 55/316

*Primary Examiner*—Ivars Cintins
*Attorney, Agent, or Firm*—H. Diamond

[57] ABSTRACT

A method of air recirculation and air makeup for a nuclear reactor control room practiced with air supply apparatus having an alternate purification loop (84) in parallel with a portion of the recirculation loop (26). In the alternate purification mode of operation of the system a predetermined portion of the recirculated air is drawn through the purification loop (84) in parallel with a flow of the remainder of the recirculated air through the normal parallel recirculation flow path (86). The volume of air drawn through the purification path (84) is established to maintain the purification loop operating at its maximum efficiency. A makeup air supply loop (24) having a normal flow path (42) and an alternate, parallel filtration flow path (50), communicates with the recirculation loop (26). The amount of air inputted to the makeup loop (24), supplied through the makeup loop (24) to the recirculation loop (26), and drawn through the filtration path (50) are controlled, in the alternate filtration mode of operation, to establish a counter flow of air in the normal makeup flow path (42) so that none of the makeup air supplied to the recirculation loop (26) bypasses the filtration path (50).

4 Claims, 3 Drawing Sheets

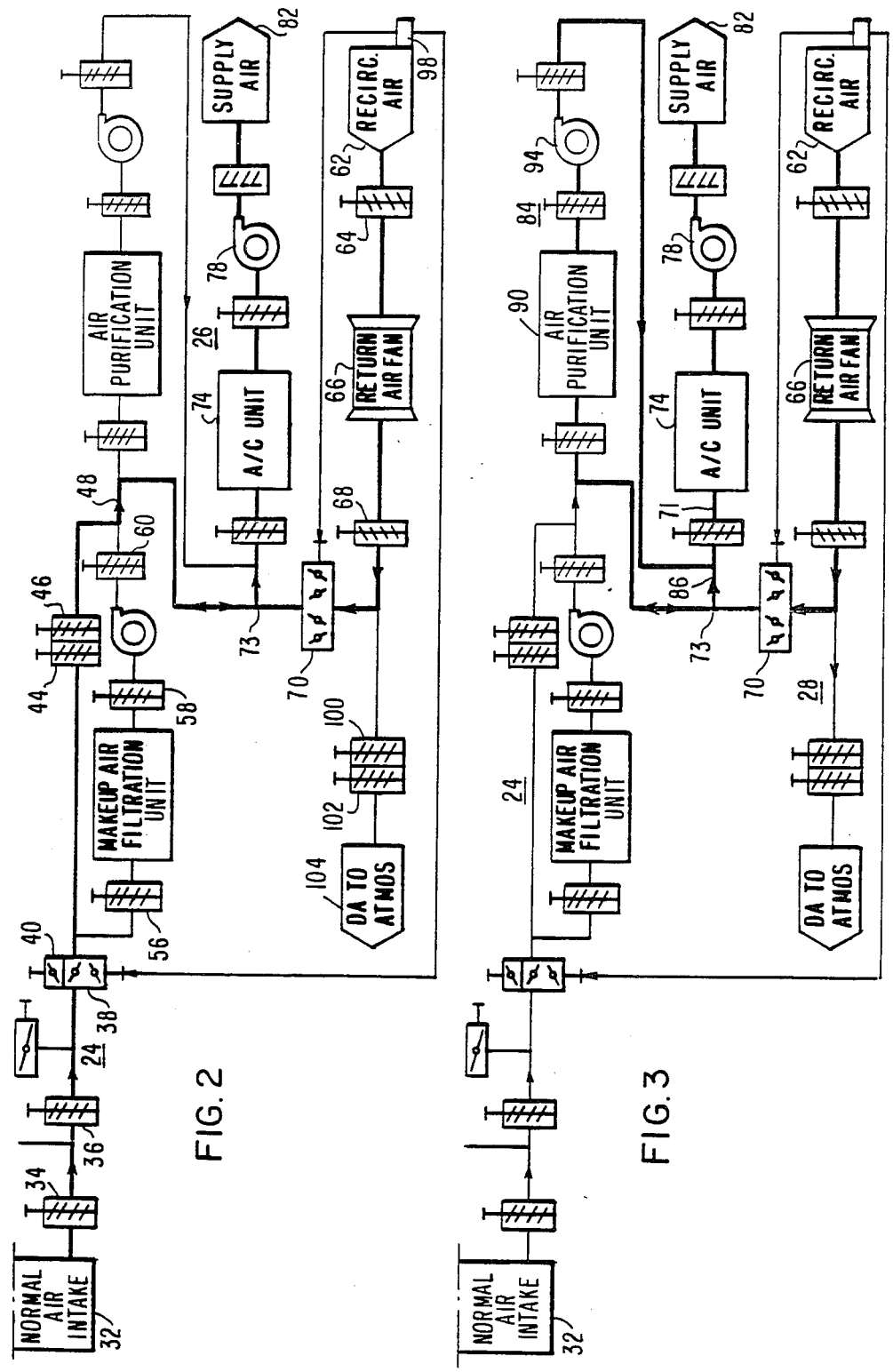

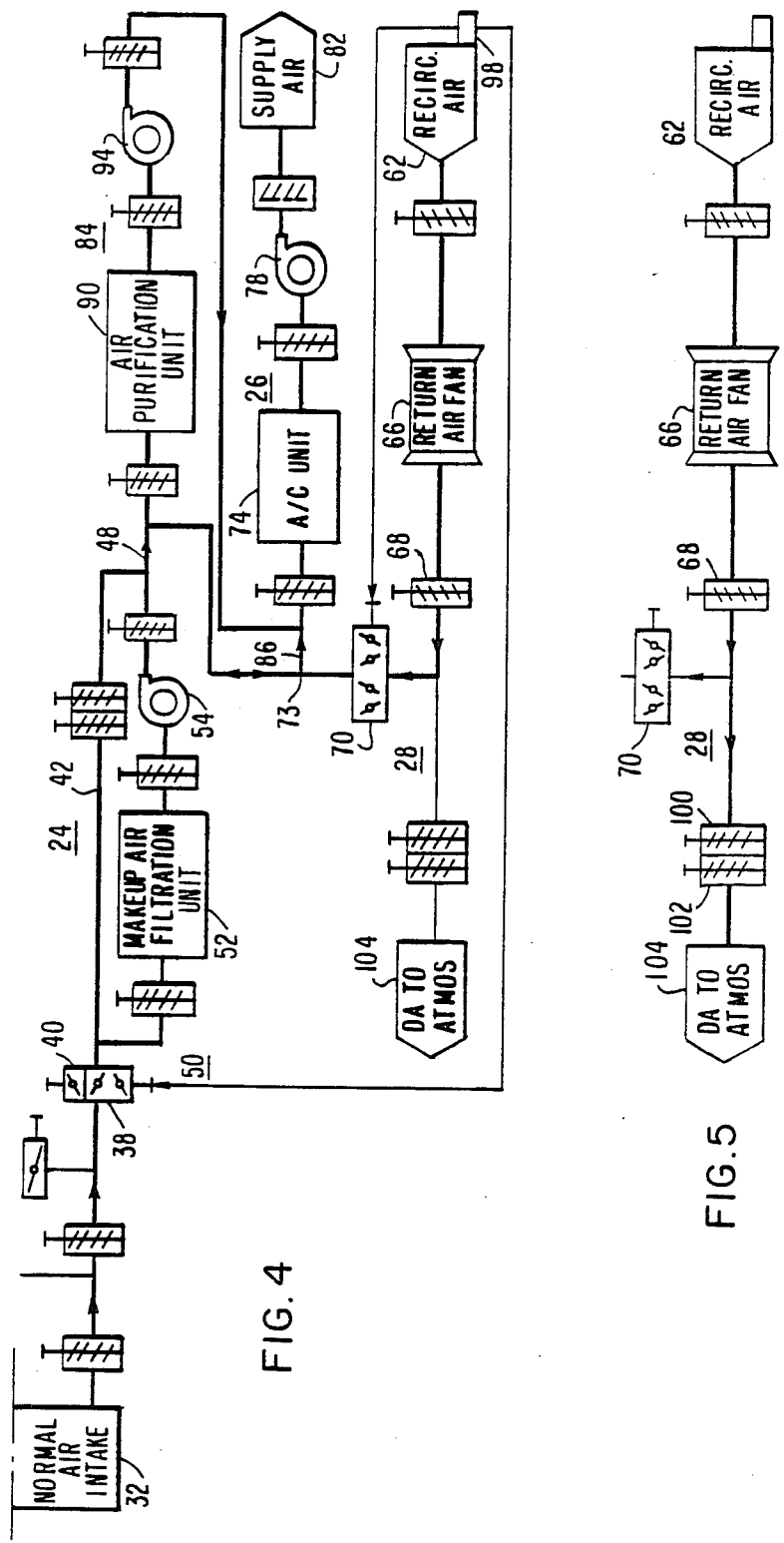

AIR SUPPLY AND RECIRCULATION SYSTEM

This application is a continuation of application Ser. No. 06/604,300 filed Apr. 26, 1984, now abandoned.

BACKGROUND OF THE INVENTION

This invention pertains generally to air makeup and recirculation systems and more particularly to such operations where purification of the air is required.

Air recirculation and makeup for nuclear reactor plants require purification flow in alternate paths to maintain the purity of a fluid within the plant in the event the plant becomes contaminated. For example, in the environmental control for a nuclear reactor power station control room purification flow paths are used in the unlikely event of an accident to protect plant personnel. Generally, there is provided a positive supply of conditioned air to maintain positive pressure within the control room relative to the surrounding environment. A sustained positive pressure within the control room reduces the unfiltered in leakage of air that is assumed would occur if the control room was not pressurized. Normal leakage paths consist of cracks and seams in walls, floors, ceilings and fluid systems.

The environment in the reactor control room is normally controlled by recirculation which draws air from the control room and recirculates it through an air conditioning unit designed to maintain a selected humidity and temperature. In addition, makeup air communicates with the air conditioning unit to makeup for normal exfiltration and sustain the desired pressure. In the unlikely event of an accident involving the release of contamination it is desirable to filter the incoming air passing through the makeup system to avoid the introduction of contamination into the control room environment. Under such circumstances it is also desirable to purify the air recirculated to the control room to reduce the effects of any contamination that might be otherwise introduced. If systems to effect the purification were placed in series with the normal makeup and recirculation flow, it would greatly increase the required filtration capacity above practical limits and effect their reliability. Alternatively, if a makeup filtration flow placed in parallel with the normal makeup flow path it would require expensive and elaborate means for closing the normal flow path under emergency conditions to assure that no filter bypass leakage existed, so that the efficiency of the filtration would be increased. Additionally the control of make up air flow would have to be modulated to control the building pressure and thereby would not allow full flow air filtration at the optimum capacity of the filtration operation. Recirculation through alternate parallel filters in a bypass mode would allow filter bypass air flow with resulting lower filtration efficiency. Accordingly, a new method of maintaining pure the air in the work area of a nuclear-reactor plant is desired. It is desired that the makeup and circulation of the air shall have an alternate purification capability that minimizes the capacity of the purification required while maximizing efficiency.

SUMMARY OF THE INVENTION

Briefly, this invention enhances air supply of the prior art that require an alternate air conditioning mode of operation by providing an alternate air conditioning flow in an arrangement that assures that, in the alternate mode of operation, all of the air passes through the conditioning flow path without any leakage through the normal flow path.

In accordance with this invention there is provided a method for maintaining the work area in a nuclear reactor plant pure and at a positive pressure over the air outside of the work area. In the practice of this method the air is recirculated through the work area through recirculating conduits which includes an air purification unit. Makeup air is supplied from the outside to the work area through an additional conduit and also through an air filter in parallel with the additional conduit. The air is pumped through the air filter at a higher rate that the rate at which it is being supplied from the outside. The makeup air is thus prevented from bypassing the air filter.

In the practice of this invention, the conduit which supplies the makeup air is isolated from recirculation conduits in the event that the air outside of the work area becomes contaminated. In addition, the flow of makeup air and recirculating air are each controlled in dependence upon the air pressure within the work area.

BRIEF DESCRIPTION OF THE DRAWINGS

For a better understanding of the invention, reference may be had to the following description taken in connection with the accompanying drawings, in which:

FIG. 2 is a schematic diagram of a portion of the ventilation system illustrated in FIG. 1, having the normal air supply and recirculation paths shown in bold lines;

FIG. 3 is a schematic diagram of a portion of the ventilation system of FIG. 1, having the recirculation flow path with filtration shown in bold lines;

FIG. 4 is a schematic diagram of a portion of the ventilation system of FIG. 1, with the makeup air supply and recirculation flow paths, both with filtration, shown in bold lines; and FIG. 5 is a schematic diagram of a portion of the ventilation system of FIG. 1, having the control room air discharge flow path shown in bold lines.

DESCRIPTION OF THE PREFERRED EMBODIMENT

Figure 1:
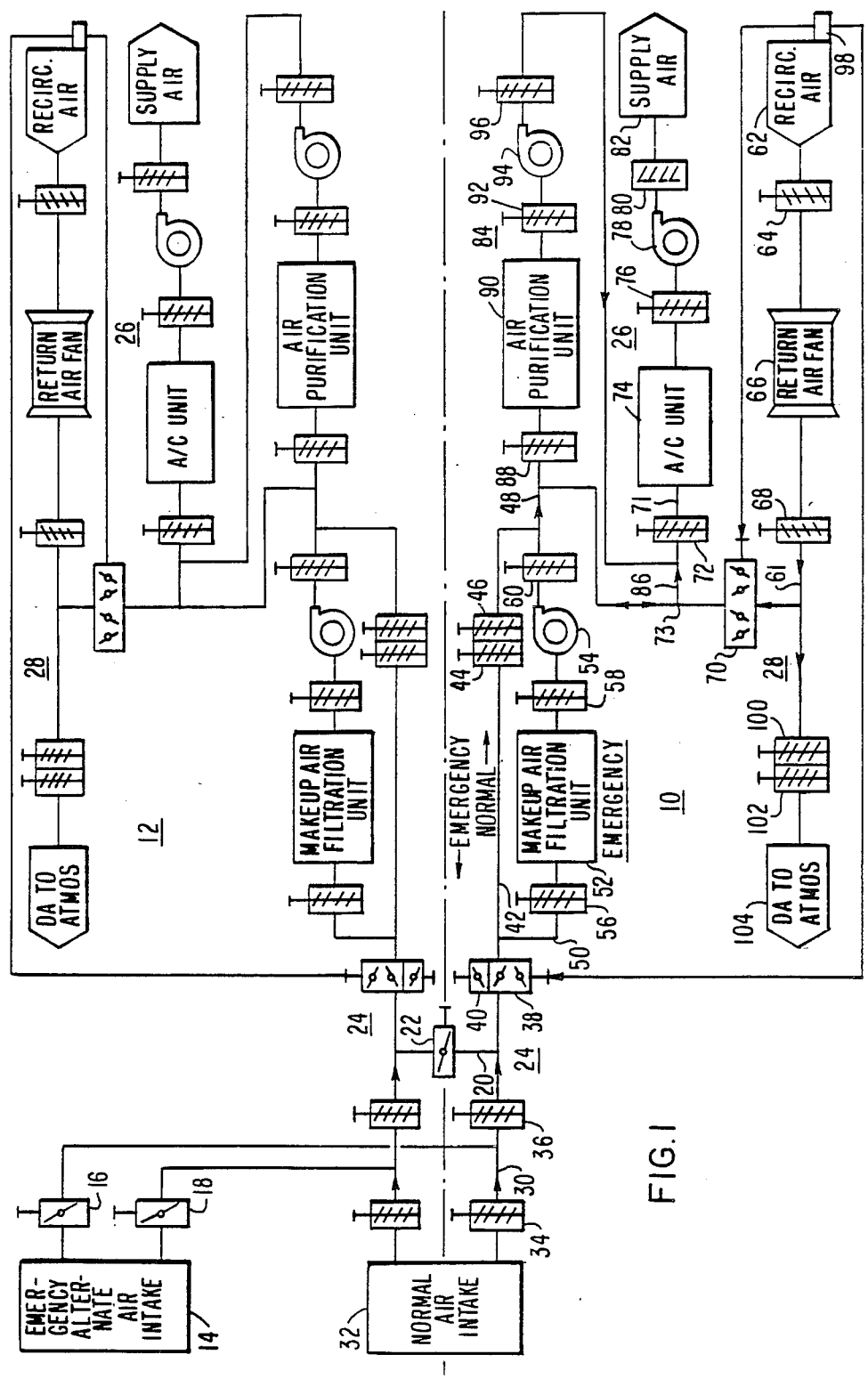
FIG. 1 is a schematic diagram of a nuclear reactor power plant control room ventilation system including the air conditioning flow circuits typically used in the practice of this invention.

This invention maximizes the efficiency and minimizes the required capacity of air conditioning units in a air supply system where either air conditioning is provided in an alternate mode of operation or where it is not required to condition the entire volume of air passing through the system in a single pass. The advantages and benefits of the invention can readily be appreciated in an application to a nuclear reactor control room ventilation system. A typical system to practice the method of this invention is illustrated in FIG. 1. The general system illustrated includes a number of redundant subsystems to assure reliability. The basic system is shown in area 10 of FIG. 1, with a redundant counterpart identified generally by reference character 12. Added redundancy is supplied to the several trains 10 and 12 through emergency alternate air intakes 14, which are respectively controlled by isolation dampers 16 and 18. Further redundancy is provided by the air intake path crossover link 20, controlled by isolation damper 22. Each of the trains 10 and 12 includes three main subsystems; an air makeup supply system 24, an air recirculation system 26, and a reactor control room purge system 28. It should be appreciated that like reference characters are employed in the respective redundant subsystem to identify corresponding components.

The practice of this invention to provide control room ventilation can be appreciated from an understanding of the operation of one of the redundant ventilation trains, for example 10, shown in FIG. 1. The makeup air supply subsystem 24 includes an inlet conduit 30 having an air intake 32 at one end in series with redundant isolation dampers 34 and 36 and modulation air flow control dampers 38 and 40. Modulation dampers 38 and 40 provide alternate parallel flow paths for the air being transported through inlet conduit 30; dampers 38 and 40 being respectively shown as double vane and single vane flow control dampers and alternately employed, respectively, to control the rate of flow of relatively large or small volumes of air through the inlet conduit 30. A normal air path conduit 42 is located in series with the parallel arrangement of modulating dampers 38 and 40 at one end and junction terminal 48 at the other end at which point the makeup air is made available to the recirculation subsystem 26. The normal air path conduit 42 includes a series arrangement of redundant isolation dampers 44 and 46. An alternate filtration flow conduit 50 is situated in parallel with and coupled to the normal flow path conduit 42; at one end at a junction between the parallel arrangement of modulating dampers 38 and 40 and the redundant isolation dampers 44 and 46, and at the other end between the isolation dampers 44 and 46 and the junction 48. The filtration flow path 50 includes a series arrangement of isolation damper 56, makeup air filtration unit 52, isolation damper 58, centrifugal fan 54, and isolation damper 60. The makeup air filtration unit is a charcoal adsorber unit, of the type generally employed in reactor control room ventilation systems, having specifications designed to satisfy the appropriate governmental regulations (i.e. U.S. Nuclear Regulatory Commission Regulatory Guide 1.52, Revision 2, March 1978).

The recirculation subsystem 26 includes a recirculation intake conduit 61 having a recirculation air inlet 62 in series with isolation damper 64, axial air return fan 66, isolation damper 68 and modulation damper 70; the latter unit controlling the rate of air recirculated through the system. The recirculation intake conduit 61 communicates with an air return conduit 71 at juncture 73 just downstream of the modulation damper 70. The air return conduit 71 includes a series arrangement of isolation damper 72, air conditioning unit 74, isolation damper 76, centrifugal air supply fan 78, check damper 80 and supply air outlet 82. The recirculation subsystem 26 also includes an air purification loop 84 connected at one end to junction 73 and at the other end to the downstream juncture of bypass segment 86 of return air conduit 71 on the upstream side of isolation damper 72. The air purification loop includes, in series, isolation damper 88, air purification unit 90, isolation damper 92, centrifugal fan 94, and isolation damper 96. The air purification unit 90 is a charcoal adsorber unit similar to the makeup air filtration unit 52. A pressure sensor 98 is positioned to sense the pressure in the control room at the intake to the recirculation system and cooperates with modulation dampers 38, 40 and 70 to control the air flow rate through the makeup air supply system 24 and the recirculation system 26.

The reactor control room purge discharge system 28 communicates with the air recirculation system 26 at a juncture between the modulation damper 70 and isolation damper 68. The discharge system includes, in series, back to back, redundant isolation dampers 100 and 102 and discharge outlet 104. The discharge system 28 operates, upon command, to purge air from the control room as will be appreciated hereafter with respect to the description of the flow path illustrated in FIG. 5.

FIG. 2 illustrates the normal operation of ventilation train 10 in the practice of this invention showing the normal air flow path in bold lines. In the explanation to follow, typical air flow rates will be cited to further an understanding of the practice of this invention, but the rates described should not be considered as limitative of this invention. During normal operation positive air pressure is maintained within the control room to sustain the desired environment. In this example it is assumed that approximately 2,500 CFM of air escapes from the control room through normal kitchen and lavatory exhaust facilities, and that approximately 1,000 CFM escapes through other exfiltration mechanisms. Accordingly, to sustain a desired air pressure within the control room the makeup air is required to replace the air lost through these mechanisms.

In the normal mode of operation in the practice of this invention modulation damper 38 is responsive to a signal from pressure sensor 98, at the recirculation inlet 62, to control the air intake of makeup air at inlet 32, to provide the desired volume of air replacement. In this mode of operation modulation damper 40 and isolation dampers 56, 58 and 60 are closed to establish a normal air supply flow path through isolation dampers 34 and 36, modulation damper 38 and isolation dampers 44 and 46 to juncture 48, at which point the desired volume of makeup air is available for introduction into the recirculation system 26. The amount of air actually supplied to the control room through outlet 82, in the recirculation system 26, is determined by the capacity of the supply air fan 78 and the head that it has to draw against. This head is varied by modulation dampers 70 and 38, with the proportion of air supplied from the recirculation input and the makeup air input 32 determined by the degree of modulation of the respective dampers 70 and 38. In this example, 30,000 CFM of air is returned to the system through the supply air outlet 82; 3,500 CFM being supplied as makeup air as aforedescribed and the balance being provided by way of the recirculation air input 62 by axial fan 66. In this mode both isolation dampers 64 and 68 are maintained in their open position, while redundant isolation dampers 100 and 102 are closed to prevent loss of air through the discharge output 104. The makeup air and the recirculated air join at juncture 73 for processing through the air conditioning unit 74 prior to being supplied to the control room. In this manner the control room atmosphere is maintained at the desired comfort level at a positive pressure relative to the surrounding environment.

FIG. 3 illustrates a second mode of operation of this invention, which can be employed in the practice of this invention in the unlikely event of an accident, under circumstances where the control room is isolated from the outside wherein, ideally, the infiltration is low. In such an event the makeup air supply system 24 and the purge system 28 would be isolated from the recirculation, by closing the corresponding isolation dampers; and the recirculation would be expanded to include filtration path 84, which is designed to maintain a fixed rate of flow of air through the air purification unit 90 so that the unit operates at its maximum efficiency. The amount of air flow through the filtration unit is established by the capacity of the filter fan 94, which is sized to match the efficiency characteristics of the purification unit 90. In this mode of operation air is drawn into the recirculation input 62, by way of the axial fan 66, through modulation damper 70 to juncture 73. In this example 32,000 CFM of air is drawn into the system through the recirculation intake 62 and the filter fan 94 draws 4,000 CFM of that intake through the air purification unit 90. The remainder of 28,000 CFM of air is drawn through the bypass line 86 by the supply air fan 78 where it joins with the filtered air returned to conduit 71 by the filter fan 94. The total 32,000 CFM of air is then drawn through the air conditioning unit 74 where it is conditioned and returned to the system by way of air supply fan 78 and supply outlet 82. In this way the filtration unit is operated at optimum efficiency with a portion of the air filtered during each recirculation pass; the amount of air filtered being determined by the design requirements of the system for practicing this invention.

An alternate emergency mode of operation in the practice of this invention, illustrated in FIG. 4, is designed to accommodate post accident conditions and infiltration in the control room, which might arise, for example, by the impact of wind on the outside of the building. In this example it is assumed that there is approximately 1,000 CFM of air exfiltration. In this mode of operation, the discharge system 28 is closed and the recirculation system 26 operates with filtration through conduit 84, similar to the arrangement illustrated in FIG. 3. The 1,000 CFM of exfiltration is made up by the makeup subsystem 24 through air intake 32. Modulation damper 38 is closed and modulation damper 40 is opened to control the smaller volume of air passing through the makeup system. In addition, the isolation dampers in filtration loop 50 are opened to permit the makeup air to be filtered before being introduced into the recirculation at junction 48. The amount of air passing through the filtration loop 50 is determined by the filter fan 54, which is sized to draw a rate of air flow through the filtration loop 50 which is larger than the rate of flow of air passing through modulation damper 40, and available at junction 48 to the recirculation system 26. In this manner a counter flow is established in the normal makeup air flow which prevents any of the makeup air introduced through modulation damper 40 from bypassing the filtration unit 52. The amount of air drawn through the filtration system is also designed to optimize the efficiency of the makeup air filtration unit 52. In a typical example, with 1,000 CFM of makeup air available through modulation damper 40, approximately 1,500 CFM of air would be drawn through the filtration loop 50, 500 CFM of air would counter flow through the normal flow path 42, and 1,000 CFM of filtered air would be available for makeup to the recirculation at juncture 48 as illustrated in FIG. 4. In this arrangement modulation damper 40 would limit the amount of air intake to 1,000 CFM and, together with the air flow resistance established at junction 48 by the modulation of damper 70, would assure that all of the 1,500 CFM of air drawn through filtration loop 50 is not deposited into filtration path 84, to maintain a counter flow of 500 CFM through the normal makeup flow path 42. In this example approximately 30,500 CFM of air is drawn into the recirculation air intake 62 under the influence of the air return fan 66, air supply fan 78 and modulation of damper 70. The air circulating in the recirculation loop is split at juncture 73, with 3,000 CFM of air flowing to juncture 48, to combine with the 1,000 CFM of air made available by the makeup system 24, to accommodate the capacity of filter fan 94. The remainder of 27,500 CFM of air introduced at the juncture 73 flows through bypass leg 86 and combines with the filtered air exiting filtration loop 84 at the juncture to the input of air conditioning unit 74. The conditioned air is then returned to the system by the supply air fan 78 through the air supply outlet 82. Accordingly, the makeup air supplied to the system receives two stages of filtration. Thus, it can be appreciated that the desired air flow rates through the various legs of the system are controlled by the judicious choice of components and by the modulation of dampers 40 and 70, which are adjusted in accordance with the pressure at the air recirculation input as identified by the pressure sensor 98. It should be further appreciated that given the aforestated specifications the choice of components for the practice of this invention is a matter of basic engineering design.

FIG. 5 illustrates the air flow path employed to purge air from the control room in the practice of this invention. When the purge sequence is desired the modulation damper 70 is closed and isolation valves 100 and 102 are opened. The return air fan 66 then draws the air from the control room and discharges it through the discharge outlet 104.

Referring to FIG. 1 it will be appreciated that in the event of a malfunction in ventilation train 10 ventilation train 12 can assume any of the aforedescribed modes of operation demanded for the practice of this invention. In addition, an alternate intake path exists through isolation damper 22 in the event of a malfunction in one of the air intakes. Further redundancy is provided in the air intake through the alternate air intake paths which enter at inlet 14 and are controlled by isolation dampers 16 and 18. Reliability is increased by the use of two independent room pressure controllers, one at each of the redundant recirculation air inputs. Though the isolation dampers are shown as manual dampers it should be appreciated that they can be replaced with motorized dampers, well known in the art, and controlled automatically to remotely implement the various functions of this invention heretofore described. The system for practicing this invention also provides redundancy at each of the isolation dampers, with dampers being provided on either side of each of the operating units to accommodate repair of the units without breaching the integrity of the air flow lines. Accordingly, the invention maximizes the efficiency of the air filtration and enhances the reliability and versatility of ventilation employing alternate filtration.

What we claim is:

1. The method of maintaining the air in a work area of a nuclear-reactor plant substantially pure and at a positive pressure with respect to the outside air, the said method comprising recirculating the air through said work area through recirculating conduits including air purification means, supplying make-up air to said work area from an air intake through an additional conduit, also supplying said make-up air through air filtration means connected in a parallel flow path with said additional conduit, and pumping said make-up air through said filtration means at a higher rate than it is being supplied from said air intake to prevent said make-up air from bypassing said filtration means through said additional conduit.

2. The method of claim 1 which includes the step of isolating the additional conduits which supply the make-up air from the recirculating conduits.

3. The method of claim 1 including the step of controlling the flow of make-up air to maintain the air in said work area at a positive pressure.

4. The method of claim 3 including the additional step of controlling the flow of recirculating air to the work area.

* * * * *